(12) United States Patent
Granger-Jones

(10) Patent No.: US 7,542,740 B1
(45) Date of Patent: Jun. 2, 2009

(54) POWER AMPLIFIER OUTPUT SWITCH USING HYBRID COMBINER

(75) Inventor: Marcus Granger-Jones, Scotts Valley, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 482 days.

(21) Appl. No.: 11/266,998

(22) Filed: Nov. 4, 2005

(51) Int. Cl.
*H01Q 11/12* (2006.01)

(52) U.S. Cl. .................. 455/127.1; 455/118; 455/552.1; 455/553.1; 340/584

(58) Field of Classification Search ................ 455/127.1
See application file for complete search history.

(56) References Cited

U.S. PATENT DOCUMENTS

2007/0046479 A1* 3/2007 Hines .......................... 340/584
2007/0105510 A1* 5/2007 Sorrells et al. .............. 455/118

* cited by examiner

*Primary Examiner*—Yuwen Pan
*Assistant Examiner*—Ajibola Akinyemi
(74) *Attorney, Agent, or Firm*—Withrow & Terranova, P.L.L.C.

(57) ABSTRACT

A multimode mobile terminal steers signals corresponding to different modes to different outputs of a quadrature combiner. For example, an EGPRS signal is steered to a first output port of the quadrature combiner and a WCDMA signal is steered to a second output port of the combiner. The combiner has a reasonably large degree of isolation between the output ports. The mobile terminal capitalizes on this isolation by reducing the isolation of a switch that facilitates switching between modes.

20 Claims, 6 Drawing Sheets

POWER AMPLIFIER OUTPUT SWITCH USING HYBRID COMBINER

FIELD OF THE INVENTION

The present invention relates to mobile terminals and in particular relates to multimode switches within multimode mobile terminals.

BACKGROUND OF THE INVENTION

Mobile terminals have evolved from the clumsy and cumbersome bag phones of the 1970s and 1980s into sleek, minute combined cellular phone/personal digital assistants that offer a host of services. As the mobile terminals have evolved, so have the communication protocols through which the mobile terminals communicate. The evolution of the communication protocols has seen different standards and different frequency bands used for the mobile terminals. Most of the older analog standards are being phased out and replaced with more robust digital and/or wideband standards such as wideband code division multiple access (WCDMA) or enhanced general packet radio service (EGPRS).

As a result of the various frequency bands and protocols available, many mobile terminals have been made which are designed to operate in multiple protocols and/or multiple frequency bands. These multimode or multiband mobile terminals have proven popular because they allow a user's mobile terminal to operate in more environments and consequently have better coverage than single mode/single band mobile terminals. Since the point of the mobile terminal is to enable the user to remain available, better coverage helps insure that the user is available in more locations. Initially, the multimode mobile terminals included separate antennas and separate receivers for each mode in which the mobile terminal was designed to operate. As is readily imagined, these separate receivers increased the size of the mobile terminal, and the extra components reduced battery life expectancy.

The next evolution of the mobile terminal was to combine the separate antennas into a single antenna and switch between receivers. While this arrangement proved adequate for early generation mobile terminals, all code division multiple access (CDMA) standards impose strict requirements on power levels emitted from the mobile terminal antenna. In addition the full duplex nature of CDMA and WCDMA require strict control on noise at the receive frequency leaking into the receive path requiring very rigorous filtering at the output of the power amplifier. A typical WCDMA filter at the output of the power amplifier attenuates adjacent receive channels by approximately 45 dB.

When the requirements for WCDMA are implemented into a multimode mobile terminal having a switch at the antenna that facilitates switching between modes by switching between transceiver elements, the switch must attenuate noise signals from the non-WCDMA mode transceiver elements by 45 dB so that noise from the non-WCDMA elements does not interfere with the WCDMA components. Designing a switch that imposes this level of attenuation is a non-trivial exercise. The typical solution is a series of switches. The series of switches has several disadvantages. First, each switching element has an associated loss. Thus, the series of switches has a relatively high loss characteristic. To compensate for the losses in the switches, the power amplifier of the mobile terminal has to boost the transmitted signal more than would be necessary in the absence of the series of switches. Second, the increase in output levels from the power amplifier requires more current drain from the battery, which accelerates drainage of the battery. Therefore, indirectly, high switch loss accelerates drainage of the battery. Third, the additional power amplifier output power required to overcome the switch insertion loss and energy dissipated in the switches creates heat. The heat generation may make the mobile terminal too hot for a typical user to handle comfortably.

One relatively recent improvement in mobile terminal power amplifiers is the use of a balanced power amplifier. Sometimes referred to as a quadrature amplifier, a balanced amplifier includes a splitter, which typically shifts one of the split signals by ninety degrees. Each of the split signals is then amplified by an amplifier chain, and the amplified signals are combined by a combiner. While the combiner has two output ports, only one output is generally used. The other output port, usually called the isolated port, is grounded. While balanced power amplifiers are useful tools, balanced power amplifiers are currently under-utilized by the mobile terminal industry.

Thus, there is a need for an improved technique for isolating different modes of a multimode mobile terminal from one another so that the presence of a first mode's operational components does not significantly degrade a second mode's performance and vice versa.

SUMMARY OF THE INVENTION

The present invention addresses the shortcomings of the conventional switching arrangements by changing the phase of signals passing through a balanced amplifier in such a manner that a signal is selectively generated at one of the two output ports, and specifically at the output port that is traditionally considered the isolated port, of the balanced power amplifier. In particular, during WCDMA operation of a mobile terminal, the balanced power amplifier generates an output signal at a first output port. During this mode of operation, the second output port is grounded. During operation of other modes, such as EGPRS, the balanced power amplifier generates an output signal at the second output port and the first output port is grounded.

Balanced power amplifiers inherently have isolation between the two output ports. In an exemplary embodiment, this isolation is approximately 15 dB. The 15 dB of isolation between the two output ports allows the switch to reduce its attenuation to approximately 30 dB. The reduction in isolation allows the number of cascaded switches used to achieve the isolation to be reduced, which in turn reduces power losses incurred at the switch, and correspondingly reduces heat the power amplifiers' output power requirements. This reduction in power requirements in turns reduces heat generation in the power amplifier and heat dissipated within the switch.

The output signal is selectively generated at one of the two output ports by changing the phase of the signals passing through the balanced power amplifier. The present invention provides a number of different embodiments. In a first embodiment, both inputs of the balanced power amplifier are used. During WCDMA operation, a first input port (the one traditionally thought of as the isolated port) is driven by the WCDMA signal and the second input port is grounded. During other modes of operation, the first input port is grounded and the second input port is driven by the signal to be transmitted.

In a second embodiment, the second input port of the splitter of the balanced power amplifier is grounded, effectively forming an isolated port therefrom, and the first input port is driven by the signals of the various modes of the mobile terminal. A switching array after the splitter of the balanced power amplifier allows the change in the phase of the quadrature signals.

In a third embodiment, the splitter of the balanced power amplifier is replaced by a lead-lag network including positive and negative forty-five degree phase shifters. In particular, the first input port is replaced by a positive forty-five degree phase shifter, and the second input port is replaced by a negative forty-five degree phase shifter. The phase shifters pass their signals to the parallel amplifier chains of the balanced power amplifier. The parallel amplifier chains amplify the signals and pass the amplified signals to the combiner of the balanced power amplifier. In a WCDMA mode, the phase shifters are driven differentially, such that the two signals start out one hundred eighty degrees out of phase. After the phase shifters, the signals are only ninety degrees out of phase and routed to the second output of the combiner. In other modes of operation, the phase shifters are driven in phase. After the phase shifters, the signals are ninety degrees out of phase and routed to the first output of the combiner.

In a fourth embodiment, two parallel quadrature modulators are used in place of the initial splitter. In a manner similar to that of the third embodiment, the signal may be steered to a desired output of the combiner.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is designed to reduce the demands placed on an isolation switch that helps a multimode mobile terminal switch between modes. In particular, the present invention varies the input signals of a balanced power amplifier in such a manner that the mobile terminal can cause the in-phase (I) signal to lead the quadrature phase (Q) signal of the balanced power amplifier or the Q signal to lead the I signal. By selectively causing the I to lead the Q (or vice versa), the mobile terminal steers the output of the balanced power amplifier to one of two output ports of the balanced power amplifier. By steering the output signal to the desired output port, the isolation of the combiner may be used to isolate the signal paths. Since some isolation is provided by the combiner, the switch does not have to provide as much isolation as it would in the absence of the present invention. Reducing the isolation requirements of the switch reduces the number of series elements required in the switch and provides power savings for the mobile terminal.

The present invention is well suited for use in a mobile terminal. As used herein, the term "mobile terminal" includes cellular phones, pagers, personal digital assistants, portable computers, and the like. Recent trends have seen a convergence of cellular phones and personal digital assistants resulting in hybrid devices such as the BLACKBERRY™ developed by Research In Motion Limited. Such hybrid devices are also considered to be mobile terminals for the purposes of the present invention. Before addressing the particulars of the present invention, a brief review of a conventional mobile terminal and the front end module of a conventional transceiver of a mobile terminal are provided with reference to FIGS. 1 and 2. The discussion of the present invention is provided below beginning with the discussion of FIG. 3.

Figure 1:
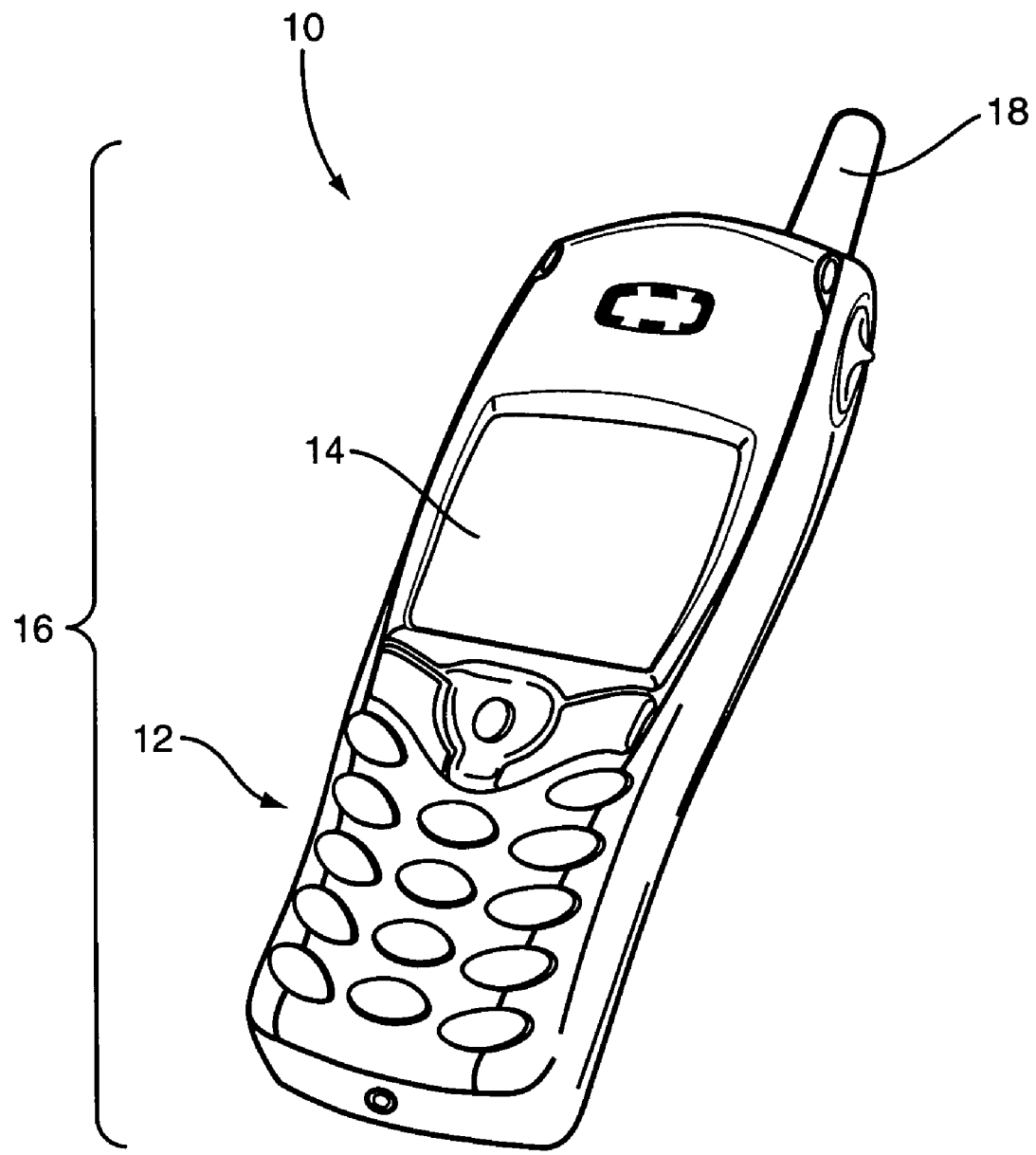
FIG. 1 illustrates a front perspective of a mobile terminal.

FIG. 1 illustrates a mobile terminal 10. The mobile terminal 10 includes a keypad 12 and a display 14 that collectively form a user interface 16. The mobile terminal 10 is equipped with an antenna 18 that facilitates wireless transmission and reception of electromagnetic signals according to any number of communication standards.

Figure 2:
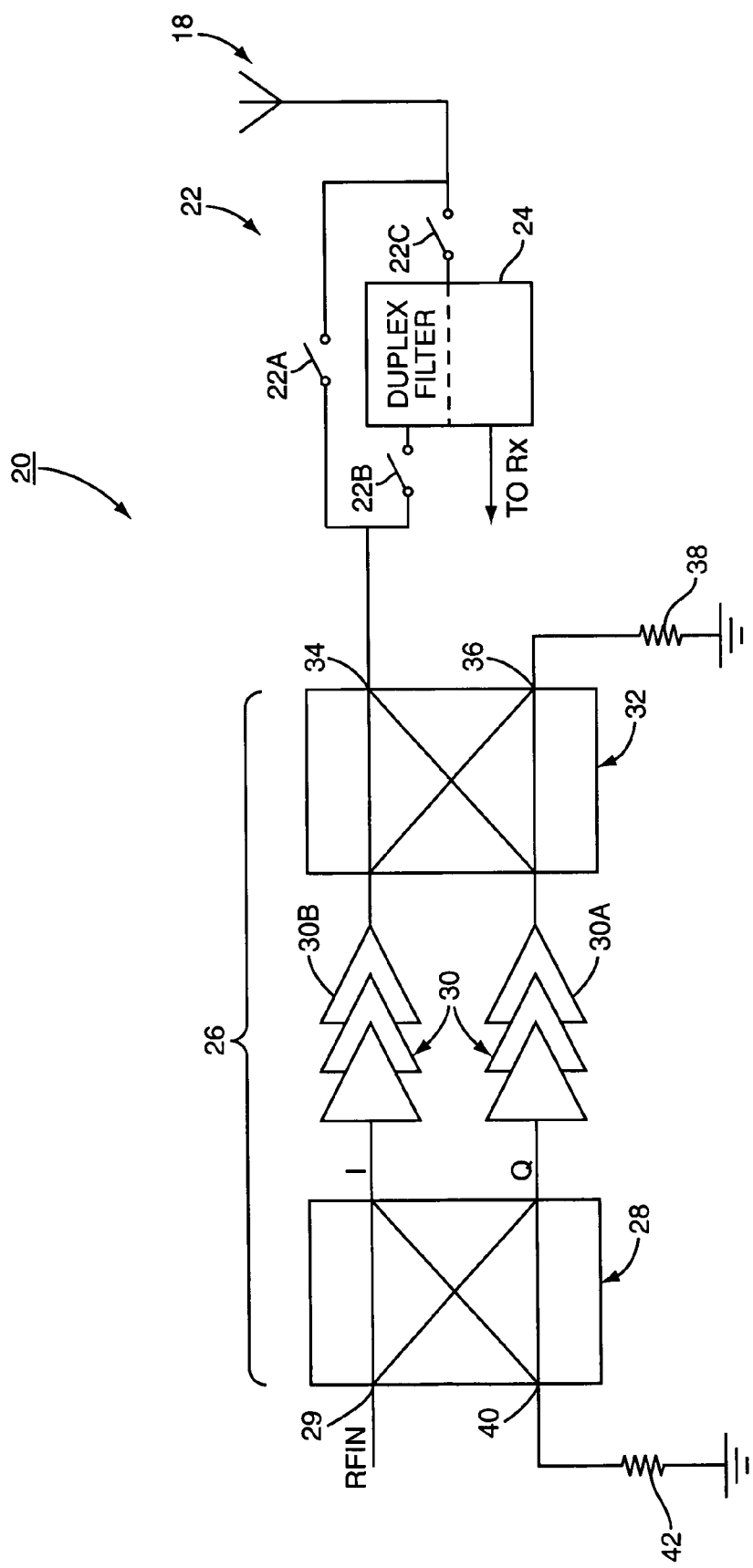
FIG. 2 illustrates a block diagram of a conventional multimode transceiver's front end module within a mobile terminal.

As noted, the mobile terminal 10 is designed to send and receive wireless electromagnetic signals through the antenna 18 over a number of communication standards. For the sake of the current example, the mobile terminal 10 is designed to operate with at least two communication standards, namely wideband code division multiple access (WCDMA) and enhanced global packet radio service (EGPRS), making the mobile terminal 10 a multimode mobile terminal 10. To effectuate this transmission and reception, the mobile terminal 10 is equipped with a transceiver. Part of the transceiver, in particular a conventional front end module 20 of the transceiver is illustrated in FIG. 2. The front end module 20 includes a switch 22 that facilitates switching between communication modes. Switch 22 is formed, in the example provided, from three switches 22A, 22B, and 22C. When the mobile terminal 10 is operating in the EGPRS mode, switch 22A is closed, and switches 22B, 22C are open. Conversely, when the mobile terminal 10 is operating in the WCDMA mode, switch 22A is open, and switches 22B, 22C are closed. The switches 22B and 22C are positioned on either side of a WCDMA duplex filter 24. The WCDMA duplex filter 24 receives signals from the antenna 18 and outputs a filtered signal to a receiver (not specifically illustrated, but the output is denoted "To Rx" in FIG. 2).

A balanced power amplifier 26 precedes the switch 22. The balanced power amplifier 26 is sometimes called a quadrature power amplifier because a single radio frequency input (RFIN) is provided to a splitter 28 at an input port 29. The splitter 28 splits the input signal and provides two outputs, one of which is shifted relative to the other by ninety degrees (effectively making an I and a Q signal). The relatively shifted signals are then passed to two parallel chains of amplifiers. Specifically, the Q signal is passed to a first amplifier chain 30A and the I signal is passed to a second amplifier chain 30B. Collectively the amplifier chains 30A and 30B are referred to as amplifiers 30. The outputs of the amplifiers 30 are then combined using a combiner 32 and passed to the switch 22 from an output port 34.

The other output port 36 (sometimes called the isolated port) of the combiner 32 is typically grounded, through a grounding impedance 38. The other input port 40 of the splitter 28 is likewise grounded through a grounding impedance 42.

The problem with the conventional arrangement of FIG. 2 lies in the switch 22. Specifically, the WCDMA duplex filter 24 provides 45 dB of isolation for neighboring receive channels. This high degree of isolation is required by the WCDMA standards so that noise generated in the transmit path at the receive frequency does not leak into and desensitize the receiver. The balanced power amplifier 26 generates noise. Some of this noise will pass through the switch 22A due to leakage and back through the WCDMA duplex filter 24 to the inputs of the receiver without being filtered by the transmit path portion of the WCDMA filter 24. To prevent this noise from desensitizing WCDMA components at the receive frequency, the switch 22A must have 45 dB of isolation when the switch 22A is open. Creating 45 dB of isolation across a switch is a non-trivial task which requires many series switches, each of which dissipates heat and contributes to loss of power in the transmitted signal, requiring larger power amplifiers to compensate for these losses.

The present invention helps to solve the problems of the conventional arrangement of FIG. 2 by using the other output port 36. To use the other output port 36, the phase of the I and Q signals in the balanced power amplifier must be changed. The change in the phase of the I and Q signals causes the balanced power amplifier 26 to act as a switch, reducing the need for a large number of series switches in switch 22A. Additionally, the isolation between the output ports 34 and 36 spreads the isolation effects previously required by the switch 22A amongst a number of components such that the switch 22A now only has to provide approximately 30 dB of isolation.

Figure 3:
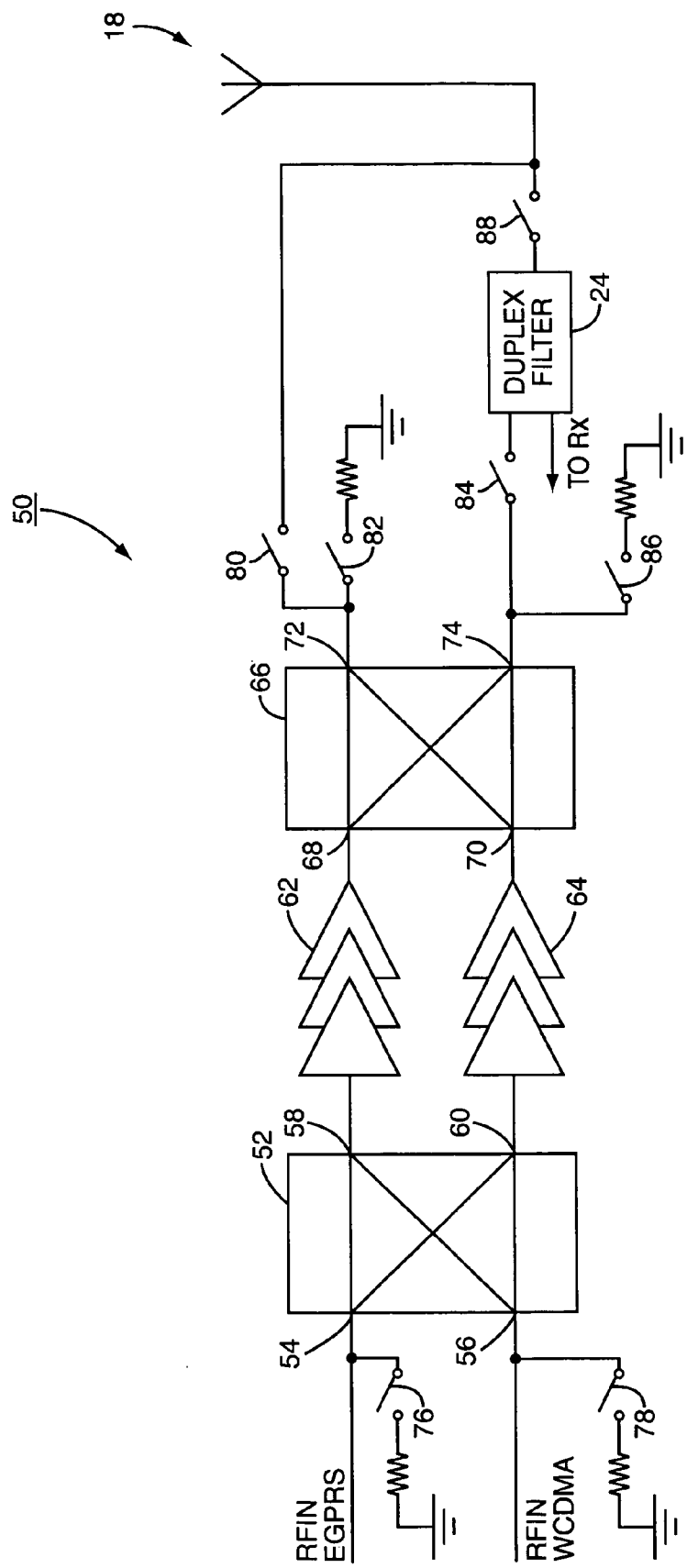
FIG. 3 illustrates a first embodiment of the modified front end module of the present invention.

The present invention may use the other output port 36 in a number of different embodiments, a few of which are presented in FIGS. 3-6. A front end module 50 according to a first embodiment of the present invention is illustrated in FIG. 3. The front end module 50 is designed to operate in two modes, which, for the sake of example, are EGPRS and WCDMA. The front end module 50 includes a splitter 52 having two inputs: a first input port 54 and a second input port 56. It is worth noting that in a conventional front end module, the first input port 54 corresponds to the normal input port and the second input port 56 is normally referred to as an isolated input port. The present invention uses the second input port 56 as is explained in more detail below. The splitter 52 has two outputs 58, 60, each of which is connected to a respective amplifier chain 62, 64. The amplifier chains 62, 64 connect to a combiner 66 through inputs 68 and 70. The combiner 66 has a first output port 72 and a second output port 74, both of which are selectively connected to the antenna 18.

In an exemplary embodiment, the splitter 52 and combiner 66 are a quadrature splitter and a quadrature combiner. An exemplary quadrature splitter is detailed in U.S. Pat. No. 5,767,756, which is hereby incorporated by reference in its entirety. Other quadrature splitter-combiners are described in U.S. Pat. Nos. 6,078,227 and 6,750,652, both of which are also incorporated by reference in their entireties. While quadrature splitters and combiners are particularly contemplated as being appropriate for the present invention, other splitters and combiners are also capable of being used as is explained in greater detail below.

The front end module 50 has a number of switches, which are used to facilitate switching between modes. The first input port 54 is associated with a first switch 76. The first switch 76 selectively couples the first input port 54 to ground through an impedance (unlabeled). The second input port 56 is associated with a second switch 78. The second switch 78 selectively couples the second input 56 to ground through an impedance (unlabeled). When the front end module 50 is operating in a WCDMA mode, the first switch 76 is closed, effectively isolating the first input port 54 while the second switch 78 is open, allowing the RFIN WCDMA input to reach the second input port 56. In contrast, when the front end module 50 is operating in an EGPRS mode, the second switch 78 is closed, effectively isolating the second input port 56 while the first switch 76 is open, allowing the RFIN EGPRS to reach the first input port 54.

The first output port 72 is associated with third switch 80 and fourth switch 82. When the front end module 50 is operating in the WCDMA mode, the fourth switch 82 is closed, effectively grounding the first output port 72 through an impedance, while the third switch 80 is open, providing isolation between the first output port 72 and the WCDMA duplex filter 24. In contrast, when the front end module 50 is operating in the EGPRS mode, the fourth switch 82 is open and the third switch 80 is closed, connecting the first output port 72 to the antenna 18.

The second output port 74 is likewise associated with a fifth switch 84, a sixth switch 86, and seventh switch 88. When the front end module 50 is operating in the EGPRS mode, fifth switch 84 is open and sixth switch 86 is closed, effectively grounding the second output port 74 so that the signal at the second output port 74 does not interfere with the signal at the first output port 72. In contrast, when the front end module 50 is operating in the WCDMA mode, the fifth switch 84 and seventh switch 88 are closed and the sixth switch 86 is open. In this manner, the signal at the second output port 74 is presented to the WCDMA duplex filter 24 and through the seventh switch 88 to the antenna 18. The state of the switches are summarized for each mode in Table 1 below.

TABLE 1

| Switch | EGPRS | WCDMA |
| --- | --- | --- |
| First switch 76 | Open | Closed |
| Second switch 78 | Closed | Open |
| Third switch 80 | Closed | Open |
| Fourth switch 82 | Open | Closed |
| Fifth switch 84 | Open | Closed |
| Sixth switch 86 | Closed | Open |
| Seventh switch 88 | Open | Closed |

The arrangement of front end module 50 allows the isolation between first output port 72 and second output port 74 to stack with the isolation of the third switch 80 such that in the WCDMA mode, the WCDMA components are not desensitized. In an exemplary embodiment, where the WCDMA duplex filter 24 offers approximately 45 dB of attenuation, the third switch 80 provides approximately 30 dB of attenuation, and the isolation between the first and second output ports 72, 74 provides approximately 15 dB of attenuation. Reducing the attenuation required to be provided by the third switch 80 relative to the switch 22A makes the design of the third switch 80 substantially easier than the earlier designs.

It should be appreciated that the use of both the input ports 54 and 56 allows the quadrature signals within the balanced power amplifier to be controlled such that the signal at the output port 58 (usually the I signal) leads the signal at the output port 60 (the Q signal) in EGPRS mode and the signal at the output port 60 (the Q signal) leads the signal at the output port 58 (the I signal) in WCDMA mode. In other words, the I signal is provided to amplifier 62 and the Q signal is provided to the amplifier 64 in EGPRS mode. In the WCDMA mode, the I signal is provided to the amplifier 64 and the Q signal is provided to the amplifier 62. By controlling the relative phases of the output of the splitter 58, the output signal of the combiner 66 is provided at either the first or second output port 72, 74 as needed or desired.

Thus, during EGPRS operation, the input signal is directed to the input port 54. The splitter 52 provides the I signal to the amplifier 62 and the Q signal to the amplifier 64. The combiner 66 combines the amplified I and Q signals to provide the output signal at the output port 72. The switches 80, 82 are controlled to couple the output port 72 to the antenna 18.

When operating in WCDMA mode, the input signal is directed to the input port 56. The splitter 52 provides the I signal to the amplifier 64 and the Q signal to the amplifier 62. The combiner 66 combines the amplified I and Q signals to provide the output signal at the output port 74. The switches 84, 86, and 88 are controlled to couple the output port 74 to the antenna 18.

Figure 4:
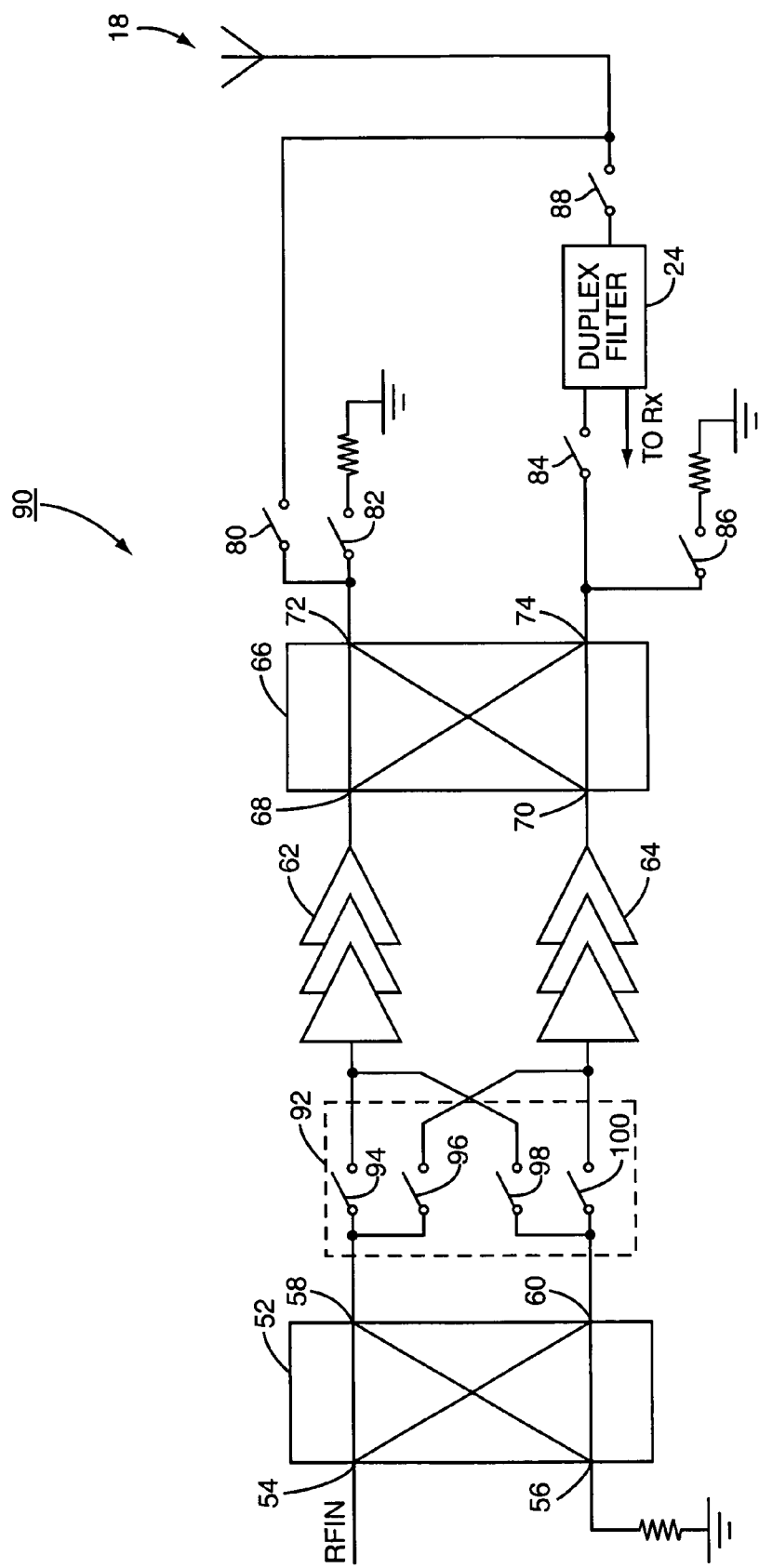
FIG. 4 illustrates a second embodiment of the modified front end module of the present invention.

A second embodiment, illustrated in FIG. 4, includes a front end module 90. Many of the components are substantially identical to the previous embodiment, and the numbering is preserved where the components are the same. In contrast to the first embodiment, the front end module 90 does not use the second input port 56 of the splitter. Rather, the I and Q signals are directed to the amplifiers 62, 64 by a switching array 92 positioned between the splitter 52 and the amplifier chains 62, 64. The switching array 92 includes eighth switch 94, ninth switch 96, tenth switch 98, and eleventh switch 100. In the EGPRS mode, eighth switch 94 is closed, ninth switch 96 is open, tenth switch 98 is open, and eleventh switch 100 is closed such that the I signal is provided to amplifier 62 and the Q signal is provided to the amplifier 64. This arrangement steers the signal at the output 58 to the input 68 and the signal at output 60 to the input 70. In contrast, in the WCDMA mode, eighth switch 94 is open, ninth switch 96 is closed, tenth switch 98 is closed, and the eleventh switch 100 is open. This arrangement steers the signal at the output port 58 to the input 70 and the signal at the output 60 to the input 68, thereby providing the I signal to the amplifier 64 and the Q signal to the amplifier 62. Operation of switches 80, 82, 84, 86, and 88 remains the same between the first and second embodiment. The state of the switches in the second embodiment is summarized in Table 2 below.

TABLE 2

| Switch | EGPRS | WCDMA |
| --- | --- | --- |
| Eighth switch 94 | Closed | Open |
| Ninth switch 96 | Open | Closed |
| Tenth switch 98 | Open | Closed |
| Eleventh switch 100 | Closed | Open |

Again, by changing which of the input signals provided to amplifiers 62 and 64 leads the other, the output signal can be steered to the desired output port 72, 74 of the combiner 66. Steerage of the signal allows the present invention to use the isolation between the output ports 72, 74 to its advantage as previously explained.

Figure 5:
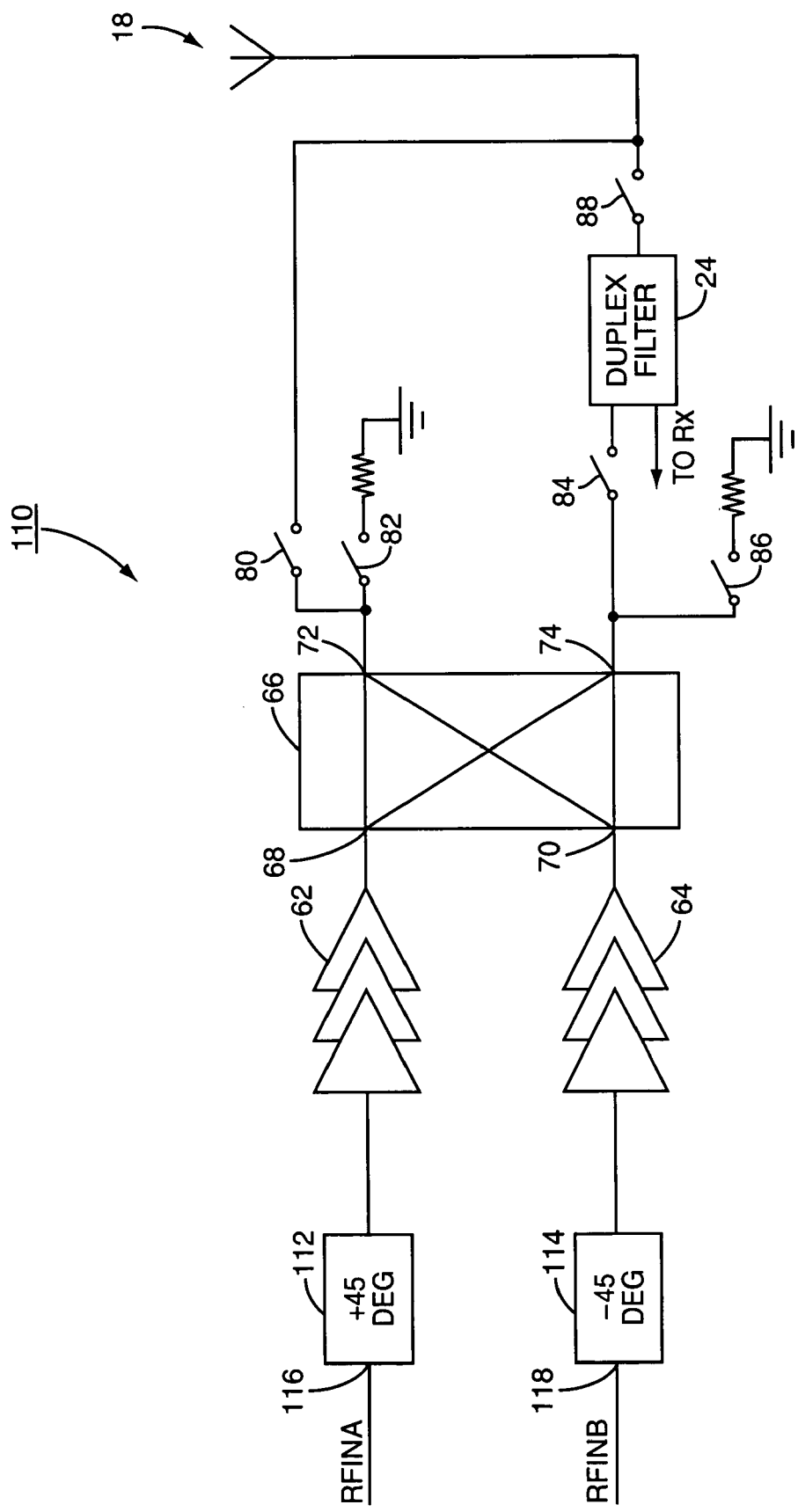
FIG. 5 illustrates a third embodiment of the modified front end module of the present invention.

A third embodiment, illustrated in FIG. 5, does not rely on switching as much to achieve the desired result, but rather uses the concept of driving the inputs in phase or differentially to achieve a similar result. Specifically, a front end module 110 includes a positive phase shifter 112 and a negative phase shifter 114. The positive phase shifter 112 is, in an exemplary embodiment, a plus forty-five degree (+45°) shifter and has an input 116. The negative phase shifter 114 is, in an exemplary embodiment, a minus forty-five degree (−45°) shifter and has an input 118. Collectively, the shifters 112, 114 are sometimes referred to as a lead-lag network. In the EGPRS mode, the inputs 116 and 118 are driven in phase by the appropriate RF Signals (RFINA, RFINB). In contrast, in the WCMDA mode, the inputs 116 and 118 are driven differentially by RFINA and RFINB. In a particular embodiment, the inputs 116 and 118 are driven one hundred eighty degrees (180°) out of phase when driven differentially.

When the inputs 116 and 118 are driven in phase in the EGPRS mode, the shifter 112 provides the I signal and the shifter 114 provides the Q signal, where I leads Q by ninety degrees. These I and Q signals are combined in the combiner 66 and output at the first output port 72. In contrast, when the inputs are driven differentially in the WCDMA mode, the shifter 114 provides the I signal and the shifter 112 provides the Q signal, where the I signal again leads the Q signal by ninety degrees. These signals are combined in the combiner 66 and output at the second output port 74. The switches 80, 82, 84, 86, and 88 operate as previously indicated to couple selectively the appropriate signal to the antenna 18. Again, the selective steering of the signal to the respective output ports 72, 74 also allows the isolation between the output ports 72, 74 to stack with the isolation of the third switch 80 and provide the desired isolation between the modes.

Figure 6:
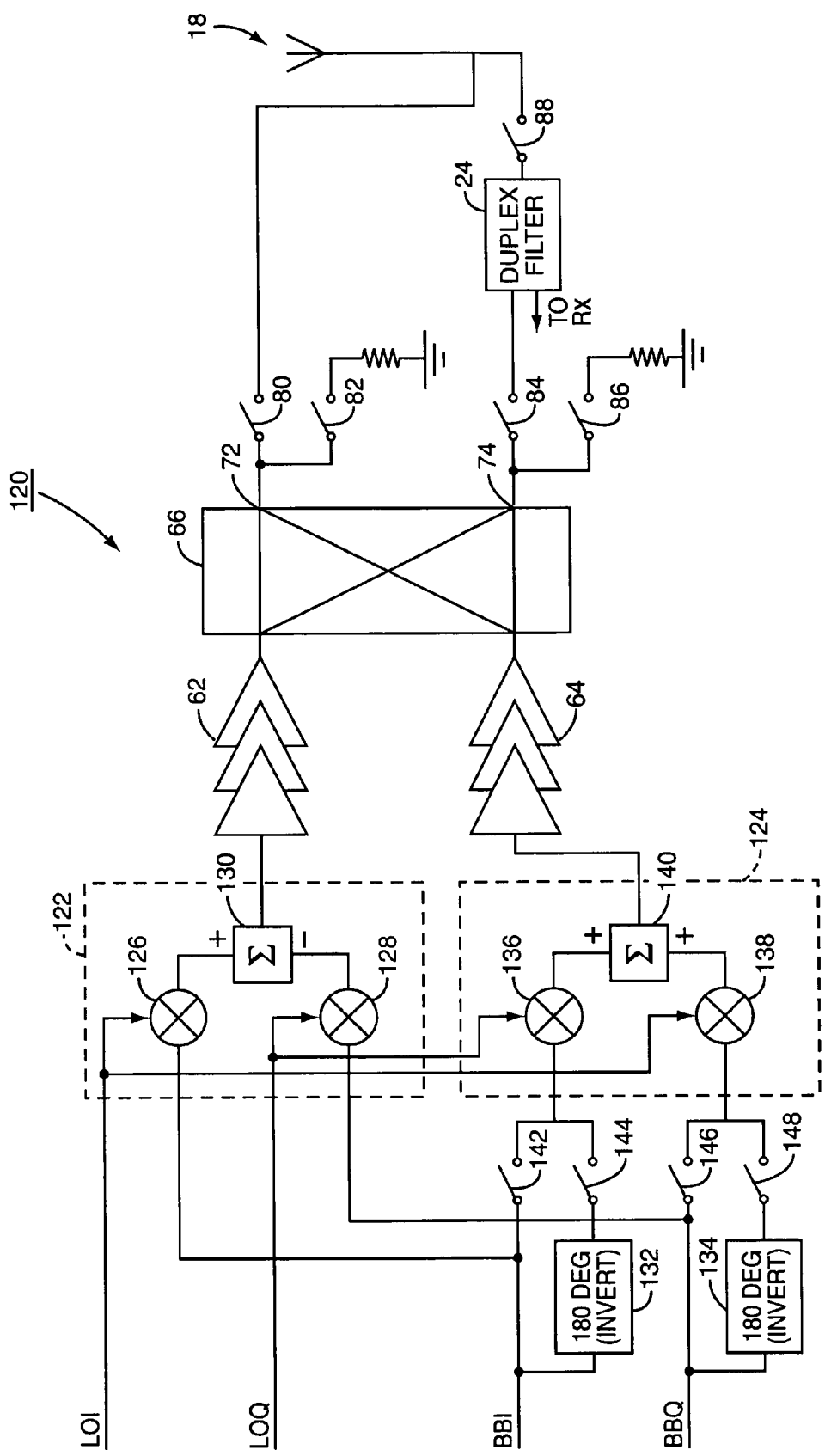
FIG. 6 illustrates a fourth embodiment of the modified front end module of the present invention.

A fourth embodiment, illustrated in FIG. 6, includes a front end module 120 that has two parallel modulators in place of the splitter of the first and second embodiments. This embodiment is, in some ways, simpler than the other embodiments and allows the removal of several circuit components. Specifically, the front end module 120 includes a first quadrature modulator 122 and a second quadrature modulator 124. The first quadrature modulator 122 receives a local oscillator I (LOI) signal and a local oscillator Q (LOQ) signal as well as a baseband I (BBI) signal and a baseband Q (BBQ) signal. The first quadrature modulator 122 mixes the I signals in a first mixer 126 and mixes the Q signals in a second mixer 128. The combined Q signal is subtracted from the combined I signal in a subtractor 130 to get a zero degree (0°) signal.

The second quadrature modulator 124 is preceded by a first inverter 132 and a second inverter 134. The first inverter 132 selectively inverts the BBI signal. The second inverter 134 selectively inverts the BBQ signal. The second quadrature modulator 124 includes third mixer 136 and a fourth mixer 138 that are summed by an adder 140. The third mixer 136 mixes the LOQ signal and either the BBI signal or an inverted BBI signal, depending on the state of switches 142, 144. The fourth mixer 138 mixes the LOI signal and either the BBQ signal or an inverted BBQ signal, depending on the state of switches 146, 148. In the EGPRS mode, the output at port 130 leads the output at port 140 by ninety degrees. In WCDMA mode, the output at port 140 leads the output at port 130 by ninety degrees.

When switch 142 and 146 are closed and switches 144 and 148 are open, front end module 120 steers the signal to the antenna 18 from the first output port 72. This situation is appropriate when the front end module 120 is operating in an EGPRS mode. In contrast, when switches 142 and 146 are open and the switches 144 and 148 are closed, front end module 120 steers the signal to the antenna 18 from the second output port 74. This situation is appropriate when the front end module 120 is operating in a WCDMA mode. Table 3 below summarizes the state of the switches 142, 144, 146, and 148.

TABLE 3

| Switch | EGPRS | WCDMA |
|--------|-------|-------|
| 142 | Closed | Open |
| 144 | Open | Closed |
| 146 | Closed | Open |
| 148 | Open | Closed |

As noted, this embodiment does not need the splitter of the first and second embodiment, nor does it need the lead-lag network of the third embodiment. This embodiment also has the benefit that the LOI, LOQ, BBI, and BBQ signals are all relatively low frequency signals, the manipulation of which is much simpler than manipulation of radio frequency (RF) signals.

While the present disclosure has focused on the splitters and combiners being quadrature elements, other sorts of splitters and combiners could be used to the same effect. For example, a Wilkinson power combiner could be used with a balun. Another possible combiner is the rat-race combiner. Rat-race combiners are well known, and have been in use for other purposes since at least 1965. Other hybrid combiners and splitters could also be used if needed or desired.

Those skilled in the art will recognize improvements and modifications to the preferred embodiments of the present invention. All such improvements and modifications are considered within the scope of the concepts disclosed herein and the claims that follow.

What is claimed is:

1. A front end module, comprising:
a balanced power amplifier comprising a first amplifier chain and a second amplifier chain adapted to amplify first and second signals to provide amplified first and second signals, wherein a phase of the first signal leads a phase of the second signal in a first mode and the phase of the first signal lags the phase of the second signal in a second mode;
a combiner comprising a first output port and a second output port, said combiner adapted to combine the amplified first and second signals into a combined signal and provide the combined signal at the first output port or the second output port depending on whether the phase of the amplified first signal leads the phase of the amplified second signal; and
a switch connected to the first output port, said switch providing attenuation thereacross when the combined signal is provided at the second output port, wherein the attenuation is supplemented by attenuation between the first and second output ports of the combiner.

2. The front end module of claim 1 further comprising a splitter, the splitter adapted to generate the first and second signals from a signal to be transmitted.

3. The front end module of claim 2 wherein the splitter comprises a quadrature splitter and the first signal is an in-phase signal and the second signal is a quadrature signal in the first mode and the first signal is a Q signal and the second signal is an I signal in the second mode.

4. The front end module of claim 3 wherein the combiner comprises a quadrature combiner.

5. The front end module of claim 3 wherein the splitter receives a signal to be transmitted at one of a first and second input ports and wherein the signal is provided to the first input port for the first mode and to the second input port for the second mode.

6. The front end module of claim 1 further comprising a lead-lag network, the lead-lag network adapted to generate the first and second signals.

7. The front end module of claim 6 wherein the lead-lag network comprises a positive phase shifter and a negative phase shifter and wherein the positive and negative phase shifters are driven in phase in a first mode so that the first signal leads the second signal and driven differentially in a second mode so that the second signal leads the first signal.

8. The front end module of claim 2 further comprising a switch array positioned between the splitter and the first and second amplifier chains, the switch array adapted to steer the first and second signals to desired inputs associated with the combiner.

9. The front end module of claim 1 further comprising two quadrature modulators adapted to generate the first and second signals respectively.

10. The front end module of claim 1 wherein the front end module is adapted to operate in one of two modes including at least a wideband code division multiple access (WCDMA) mode.

11. The front end module of claim 10 further comprising a duplex filter selectively coupled to the second output port of the combiner for use in the WCDMA mode.

12. A method of providing isolation between transmission paths in a multimode front end module, comprising:
generating first and second signals wherein a phase of the first signal leads a phase of the second signal or the phase of the second signal leads the phase of the first signal;
amplifying the first and second signals;
combining with a combiner having a first output port and a second output port the first and second signals to form a combined signal, wherein the first output port has a switch coupled thereto;
steering the combined signal to one of the first and second output ports of the combiner so as to operate in different modes of the multimode front end module such that the combiner provides isolation between the first and second output ports; and
providing attenuation across the combiner with the switch when the combined signal is provided at the second output port, wherein the attenuation is supplemented by attenuation between the first and second output ports of the combiner.

13. The method of claim 12 wherein generating the first and second signals comprises splitting a signal to be transmitted into the first and second signals.

14. The method of claim 13 wherein the first signal is an in-phase signal and the second signal is a quadrature signal in a first mode and the first signal is a quadrature signal and the second signal is an in-phase signal in a second mode.

15. The method of claim 14 wherein, prior to splitting, the method comprises receiving the signal to be transmitted at one of a first and second input ports and wherein the signal is provided to the first input port for the first mode and to the second input port for the second mode.

16. The method of claim 12 wherein generating the first signal comprises shifting a phase of a first input signal by a positive amount and wherein generating the second signal comprises shifting a phase of a second input signal by a negative amount using a lead-lag network.

17. The method of claim 16 further comprising driving the first and second input signals in phase in a first mode so that the first signal leads the second signal and driving the first and second signals differentially in a second mode so that the second signal leads the first signal.

18. The method of claim 12 further comprising switching paths for the first and second signals between two amplifier paths before amplifying.

19. The method of claim 12 wherein generating the first and second signals comprises using two quadrature modulators to generate the first and second signals.

20. The method of claim 12 wherein the multimode front end module operates in one of two modes including at least a wideband code division multiple access (WCDMA) mode.

* * * * *